(12) United States Patent
Ichihara et al.

(10) Patent No.: US 8,027,777 B2
(45) Date of Patent: Sep. 27, 2011

(54) FUEL SUPPLY SYSTEM AND METHOD FOR SUPPLYING FUEL

(75) Inventors: Hideaki Ichihara, Obu (JP); Yoshinori Yamashita, Kariya (JP); Kouichi Sugiyama, Nagoya (JP); Hidekazu Oomura, Hekinan (JP)

(73) Assignee: Denso Corporation, Kariya (JP)

( * ) Notice: Subject to any disclaimer, the term of this patent is extended or adjusted under 35 U.S.C. 154(b) by 464 days.

(21) Appl. No.: 12/368,501

(22) Filed: Feb. 10, 2009

(65) Prior Publication Data

US 2009/0248275 A1    Oct. 1, 2009

(30) Foreign Application Priority Data

Mar. 27, 2008    (JP) ................................. 2008-084524

(51) Int. Cl.
*F02D 45/00* (2006.01)
*F02D 19/06* (2006.01)
*F02D 41/30* (2006.01)
(52) U.S. Cl. ..................... 701/103; 123/525; 123/304
(58) Field of Classification Search .......... 701/103–105; 123/299, 300, 304, 525
See application file for complete search history.

(56) References Cited

U.S. PATENT DOCUMENTS

| 4,913,099 | A | 4/1990 | Ota |
| 6,588,406 | B2* | 7/2003 | Oprea ........................... 123/525 |
| 7,318,414 | B2* | 1/2008 | Hou ............................... 123/458 |
| 7,565,793 | B2* | 7/2009 | Shelby et al. ............... 60/39.463 |
| 2004/0139944 | A1 | 7/2004 | Nakano et al. |

FOREIGN PATENT DOCUMENTS

| JP | 04-334738 | 11/1992 |
| JP | 2000-179368 | 6/2000 |
| JP | 2005-180343 | 7/2005 |
| JP | 2007-132213 | 5/2007 |
| JP | 2007-278121 | 10/2007 |

OTHER PUBLICATIONS

Japanese Office Action dated Mar. 2, 2010, issued in corresponding Japanese Application No. 2008-084524, with English translation.

* cited by examiner

*Primary Examiner* — Hieu T Vo
(74) *Attorney, Agent, or Firm* — Nixon & Vanderhye

(57) ABSTRACT

A fuel supply system supplies composite fuel containing alcohol and gasoline to multiple cylinders of an internal combustion engine. The composite fuel includes main-fuel and sub-fuel. The sub-fuel is lower than main-fuel in concentration of alcohol. Each of multiple first fuel injection valves is provided to each of the cylinders for injecting fuel. Each of multiple second fuel injection valves is provided to each of the cylinders for injecting fuel. A fuel inlet portion supplies at least sub-fuel to each of the first fuel injection valves and each of the second fuel injection valves. A selector control unit selects one of main-fuel and sub-fuel supplied through the fuel inlet portion to each of the first fuel injection valves.

20 Claims, 16 Drawing Sheets

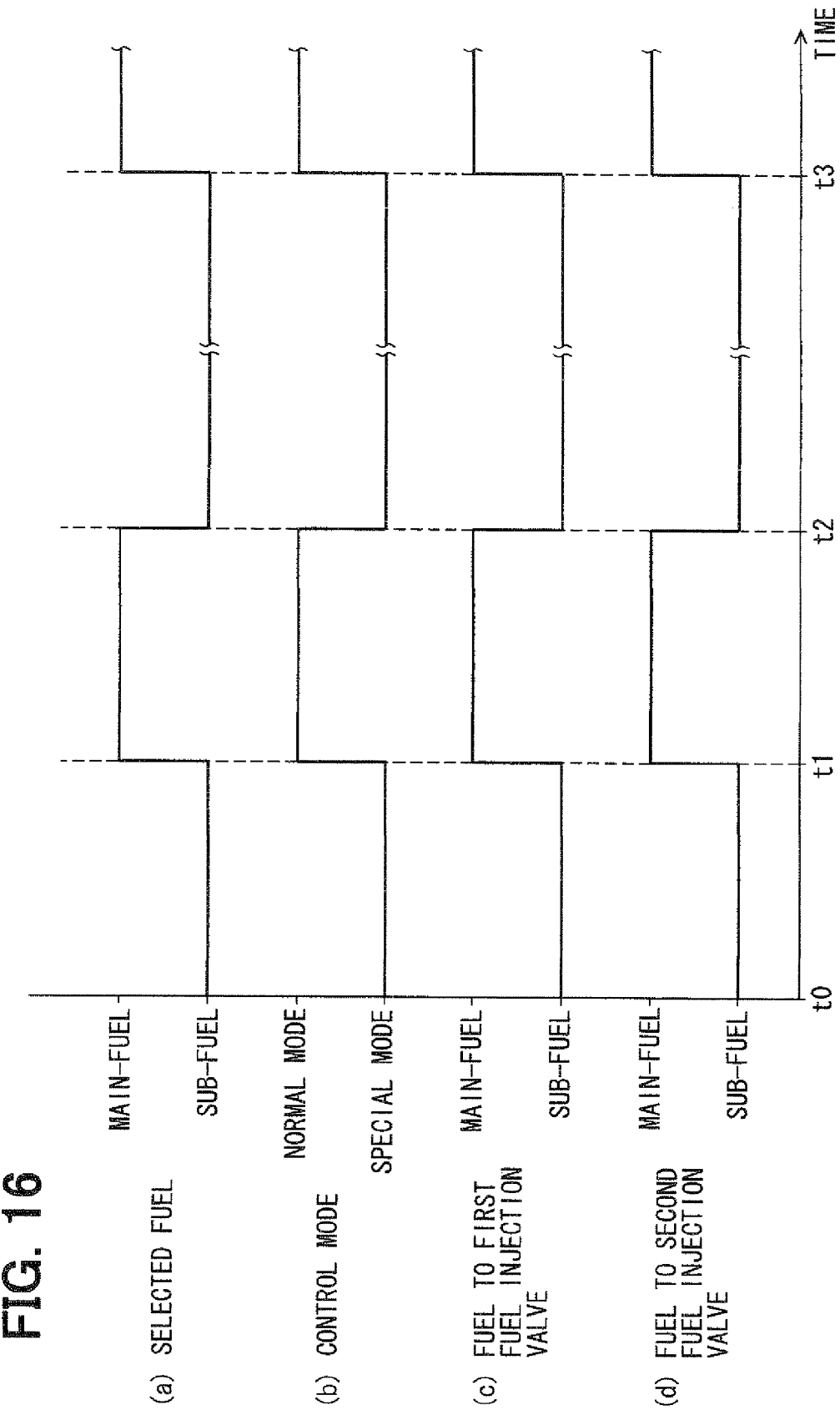

FUEL SUPPLY SYSTEM AND METHOD FOR SUPPLYING FUEL

CROSS REFERENCE TO RELATED APPLICATIONS

This application is based on and incorporates herein by reference Japanese Patent Application No. 2008-84524 filed on Mar. 27, 2008.

FIELD OF THE INVENTION

The present invention relates to a fuel supply system configured to supply and inject composite fuel containing alcohol and gasoline into multiple cylinders of an internal combustion engine. The present invention further relates to a method for supplying the composite fuel.

BACKGROUND OF THE INVENTION

In recent years, composite fuel, which is mixture of gasoline and alcohol such as bioethanol, is widely recognized as fuel excellent in reduction in environmental pollution when used for an internal combustion engine. For example, JP-A-2007-278121 proposes a fuel supply system for selectively supplying composite fuel including main-fuel, which is high in alcohol concentration, and sub-fuel, which is low in alcohol concentration, into each cylinder of an internal combustion engine. Specifically, in the fuel supply system of JP-A-2007-278121, a fuel injection valve is provided near an intake port of each cylinder injects main-fuel, and an injection nozzle is provided at the upstream of the intake port of each cylinder injects sub-fuel. In the present structure, a duty-controlled valve controls sub-fuel, which is supplied to the injection nozzle and injected from the injection nozzle, when the internal combustion engine is started under a low temperature state, for example. However in the fuel supply system of JP-A-2007-278121, the injection nozzle is used for supplying sub-fuel being low in alcohol concentration. In the present structure, sub-fuel may not be sufficiently atomized and sprayed, and consequently the internal combustion engine may not be steadily started. Furthermore, in the fuel supply system of JP-A-2007-278121, main-fuel being high in alcohol concentration is regularly supplied to the fuel injection valve so as to reduce environmental pollution. In the present structure, deteriorated component of main-fuel may be easily cause deposit on the tip end of the fuel injection valve. When deposit accumulates on the tip end of the fuel injection valve, quantity of fuel injected from the fuel injection valve may be reduced, and consequently durability of the fuel injection valve may be reduced. Therefore, an occupant of the vehicle needs to perform a periodical maintenance operation such as supplying sub-fuel to the fuel injection valve so as to remove deposit from the fuel injection valve.

SUMMARY OF THE INVENTION

In view of the foregoing and other problems, it is an object of the present invention to produce a fuel supply system capable of securing startability of an internal combustion engine, securing durability of the fuel supply system, and reducing environmental pollution. The present invention further relates to a method for supplying the composite fuel.

According to one aspect of the present invention, a fuel feed system for supplying composite fuel containing alcohol and gasoline to a plurality of cylinders of an internal combustion engine, the composite fuel including main-fuel and sub-fuel, the sub-fuel being lower than main-fuel in concentration of alcohol, the fuel feed system comprises a plurality of first fuel injection valves each provided correspondingly to each of the plurality of cylinders and configured to inject fuel. The fuel feed system further comprises a plurality of second fuel injection valves each provided correspondingly to each of the plurality of cylinders and configured to inject fuel. The fuel feed system further comprises a fuel inlet portion configured to supply at least sub-fuel to each of the plurality of first fuel injection valves and each of the plurality of second fuel injection valves. The fuel feed system further comprises selector control means for selecting one of main-fuel and sub-fuel supplied through the fuel inlet portion to a controlled valve. The controlled valve includes each of the plurality of first fuel injection valves.

According to another aspect of the present invention, a method for feeding composite fuel containing alcohol and gasoline to a plurality of cylinders of an internal combustion engine, the composite fuel including main-fuel and sub-fuel, the sub-fuel being lower than main-fuel in concentration of alcohol, the method comprises selecting one of main-fuel and sub-fuel. The method further comprises supplying the one of main-fuel and sub-fuel to a plurality of first fuel injection valves each provided correspondingly to each of the plurality of cylinders.

BRIEF DESCRIPTION OF THE DRAWINGS

The above and other objects, features and advantages of the present invention will become more apparent from the following detailed description made with reference to the accompanying drawings. In the drawings:

FIG. 16 is a time chart showing a selector control operation of the fuel supply system according to the eighth embodiment.

DETAILED DESCRIPTION OF PREFERRED EMBODIMENTS

First Embodiment

Figure 1:
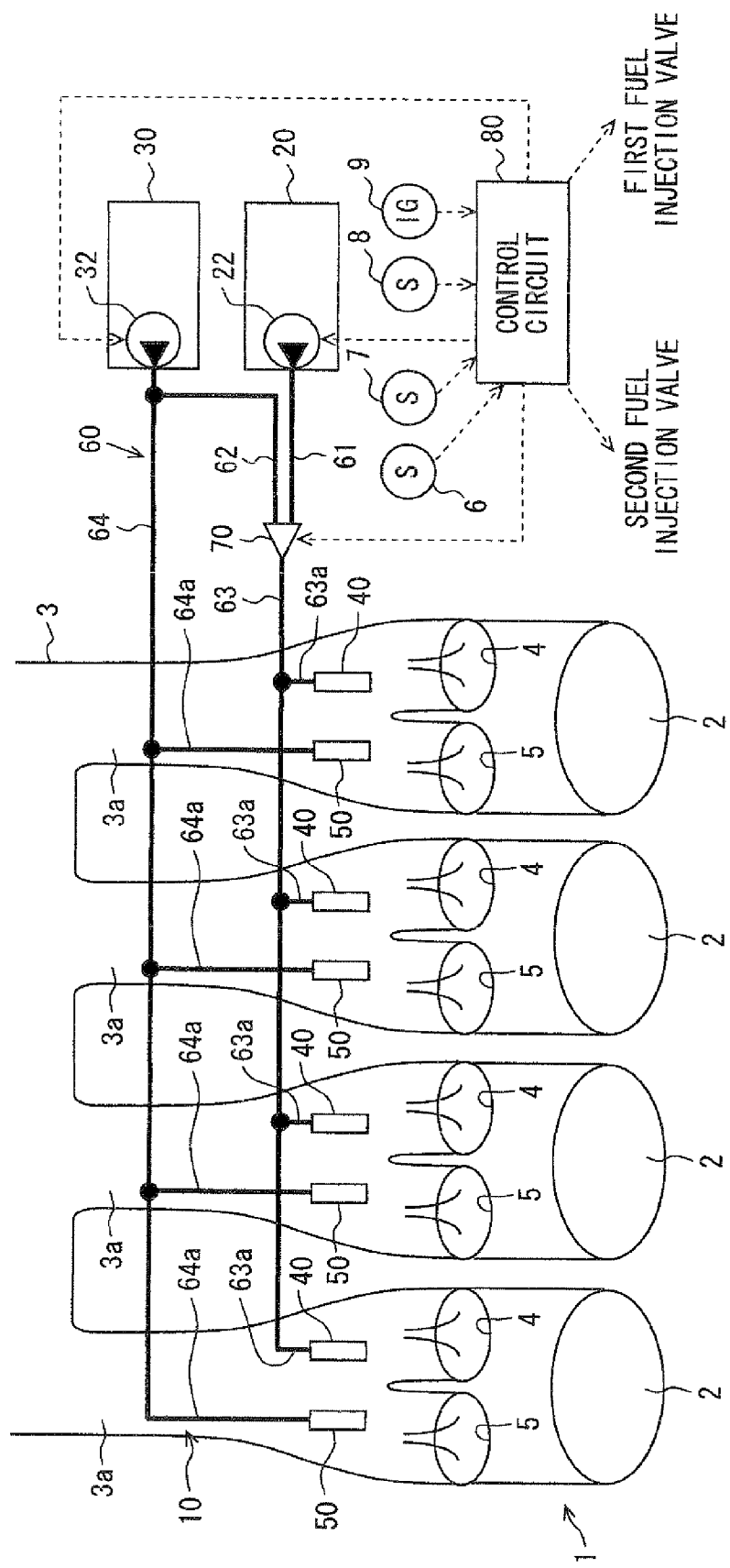
FIG. 1 is a schematic view showing a fuel supply system and an internal combustion engine applied with the fuel supply system according to a first embodiment.

FIG. 1 shows a fuel supply system 10 according to the first embodiment. The fuel supply system 10 is applied to an internal combustion engine 1 for a flexible fuel vehicle (FFV). The internal combustion engine 1 includes multiple cylinders 2 each being connected with a branch pipe 3a of an air intake manifold 3 via a pair of intake ports 4, 5. In the present structure, air is drawn from the outside of the vehicle through the air intake manifold 3 into each cylinder 2 of the internal combustion engine 1, and fuel spray is supplied into each cylinder through the intake ports 4, 5. The air and the fuel spray are mixed in each cylinder so as to produce air-fuel mixture. The air-fuel mixture is burned in response to spark caused by a spark plug (not shown), thereby causing driving force. The driving force is transmitted to driving wheels of the vehicle.

The fuel supply system 10 for the internal combustion engine 1 includes fuel tanks 20, 30, fuel pumps 22, 32, fuel injection valves 40, 50, a fuel inlet portion 60, a common selector valve 70, and a control circuit 80.

The main-fuel tank 20 stores main-fuel, which is composite fuel produced by mixing a predetermined concentration of alcohol with gasoline. The main-fuel is supplied from the outside of the vehicle. In the present embodiment, the main-fuel is composite fuel such as E85 fuel, which contains bioethanol as alcohol of concentration greater than or equal to 85%. The main-fuel may be another composite fuel, which is higher than sub-fuel in concentration of alcohol. The main-fuel pump 22 is an electric pump, which is operated in response to electricity supply. The main-fuel pump 22 is accommodated in the main-fuel tank 20 and connected with the fuel inlet portion 60. The main-fuel pump 22 is configured to pump main-fuel from the main-fuel tank 20 and supply the main-fuel to the fuel inlet portion 60.

The sub-fuel tank 30 stores sub-fuel, which is composite fuel produced by mixing gasoline with alcohol of a lower concentration than the main-fuel. The sub-fuel is supplied from the outside of the vehicle. In the present embodiment, the sub-fuel is composite fuel such as E25 fuel, which contains bioethanol as alcohol of concentration greater than or equal to 25%. The sub-fuel may be another composite fuel, which is less than main-fuel in concentration of alcohol. The sub-fuel pump 32 is an electric pump, which is operated in response to electricity supply. The sub-fuel pump 32 is accommodated in the sub-fuel tank 30 and connected with the fuel inlet portion 60. The sub-fuel pump 32 is configured to pump sub-fuel from the sub-fuel tank 30 and supply the sub-fuel to the fuel inlet portion 60.

Figure 2:
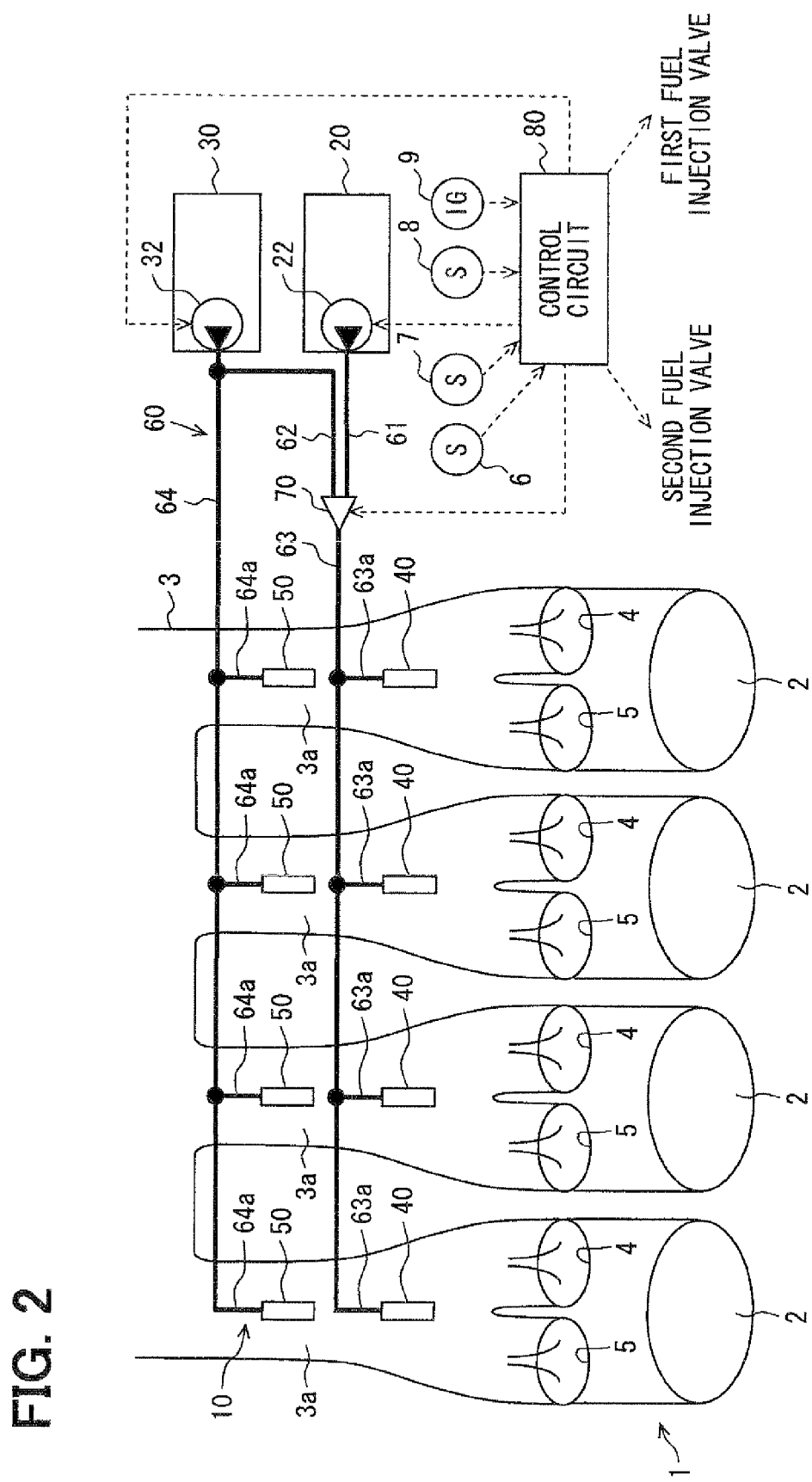
FIG. 2 is a schematic view showing a modification of the fuel supply system shown in FIG. 1.

A first fuel injection valve 40 is a solenoid valve configured to open and close in response to electricity supply. The first fuel injection valve 40 is provided to each cylinder 2 and connected with the fuel inlet portion 60. The fir fuel injection valve 40 is supplied with composite fuel from the fuel inlet portion 60. The first fuel injection valve 40 injects the supplied composite fuel from a tip end thereof into the cylinder 2 when being opened. In the present embodiment, the first fuel injection valve 40 is located at the upstream of the intake ports 4, 5 of the cylinder 2. As shown in FIG. 1, the first fuel injection valve 40 may be located so as to inject fuel into the cylinder 2 mainly through one intake port 4. Alternatively, as shown in FIG. 2, the first fuel injection valve 40 may be located so as to inject fuel into the cylinder 2 through both the intake ports 4, 5.

A second fuel injection valve 50 is a solenoid valve configured to open and close in response to electricity supply. The second fuel injection valve 50 is provided to each cylinder 2 and connected with the fuel inlet portion 60. The second fuel injection valve 50 is supplied with composite fuel from the fuel inlet portion 60. The second fuel injection valve 50 injects the supplied composite fuel from a tip end thereof into the cylinder 2 when being opened. In the present embodiment, the second fuel injection valve 50 is located at the upstream of the intake ports 4, 5 of the cylinder 2. As shown in FIG. 1, the second fuel injection valve 50 may be located so as to inject fuel into the cylinder 2 mainly through the other intake port 5, which is different from the intake port 4, which corresponds to the first fuel injection valve 40 in the structure of FIG. 1. Alternatively, as shown in FIG. 2 the second fuel injection valve 50 may be located so as to inject fuel into the cylinder 2 through both the intake ports 4, 5.

The fuel inlet portion 60 includes multiple fuel rails 61 to 64 and the like. The main-fuel rail 61 is connected with the main-fuel pump 22 in the main-fuel tank 20 and the common selector valve 70 and configured to supply main-fuel from the main-fuel pump 22 to the common selector valve 70. The sub-fuel rail 62 is connected with the sub-fuel pump 32 in the sub-fuel tank 30 and the common selector valve 70 and configured to supply sub-fuel from the sub-fuel pump 32 to the common selector valve 70.

The first fuel rail 63 is connected with the common selector valve 70. The first fuel rail 63 is further connected with each first fuel injection valve 40 correspondingly through each first branching rail 63a. In the present structure, the first fuel rail 63 is configured to supply selectively main-fuel supplied from the main-fuel pump 29 or sub-fuel supplied from the sub-fuel pump 32 to each first fuel injection valve 40 in response to an operation state of the common selector valve 70. The second fuel rail 64 is connected with the sub-fuel pump 32 in the sub-fuel tank 30. The second fuel rail 64 is further connected with each second fuel injection valve 50 correspondingly through each second branching rail 64a. In the present structure, the second fuel rail 64 is configured to supply sub-fuel from the sub-fuel pump 32 regularly to each second fuel injection valve 50.

The common selector valve 70 is a three-way solenoid valve, which is configured to select one of the main-fuel rail 61 and the sub-fuel rail 62 to be connected with the first fuel rail 63 in response to electricity supply. When the common selector valve 70 communicates the first fuel rail 63 with the main-fuel rail 61, main-fuel flows from the main-fuel rail 61 through the first fuel rail 63 to each first fuel injection valve 40. Alternatively, when the common selector valve 70 communicates the first fuel rail 63 with the sub-fuel rail 62, sub-fuel flows from the sub-fuel rail 62 through the first fuel rail 63 to each first fuel injection valve 40. In the present structure, the common selector valve 70 is provided commonly to the first fuel injection valves 40 so as to select one of main-fuel and sub-fuel to be supplied to the first fuel injection valves 40.

The control circuit 80 is mainly constructed of a microcomputer and electrically connected with the fuel pumps 22, 32, the fuel injection valves 40, 50 and the common selector valve 70. The control circuit 80 is further electrically connected with a temperature sensor 6, a velocity sensor 71 a rotation speed sensor 8, and an ignition switch 9. The temperature sensor 6 is configured to detect at least one of temperature of cooling-water of the internal combustion engine 1, temperature of lubricating oil of the internal combustion engine 1, and temperature of intake air of the internal combustion engine 1. The control circuit 80 determines operation temperature of the internal combustion engine 1 in accordance with an output signal from the temperature sensor 6. The velocity sensor 7 detects velocity of the vehicle or rotation speed of the driving wheels of the vehicle. The control circuit 80 monitors a travel distance of the vehicle as a driving history of the internal combustion engine 1, in accordance with an output signal from the velocity sensor 7. The rotation speed sensor 8 detects rotation speed of the internal combustion engine 1. The control circuit 80 determines an operation state of the internal combustion engine 1 in accordance with an output signal from the rotation speed sensor 8. The ignition switch 9 inputs an ON/OFF instruction of the internal combustion engine 1 from an occupant of the vehicle. The control circuit 80 detects the ON/OFF instruction of the internal combustion engine 1 in accordance with an output signal from the ignition switch 9.

The control circuit 80 having the above-described electrical connection starts control of electricity supply to each of the fuel pumps 22, 32, each of the fuel injection valves 40, 50, and the common selector valve 70, in response to detection of the ON instruction of the internal combustion engine 1 based on the output signal from the ignition switch 9. The control circuit 80 performs the electric control of each of the devices in accordance with the output signal from each of the sensors 6 to 8. On the contrary, in response to detection of the OFF instruction of the internal combustion engine 1 based on the output signal from the ignition switch 9, the control circuit 80 terminates the control of electricity supply to the fuel pumps 22, 32, the fuel injection valves 40, 50, and the common selector valve 70 in accordance with the output signals from the sensors 6 to 8.

As follows, some characteristic operations of the fuel supply system 10 will be described in detail with reference to FIGS. 3, 4. Specifically, the control circuit 80 executes a computer program so as to perform a selector control operation. The control circuit 80 starts the selector control operation in response to detection of the ON instruction of the internal combustion engine 1 based on the output signal from the ignition switch 9. At the start time point t0 in FIG. 3, the control circuit 80 controls the common selector valve 70 to supply sub-fuel to each first fuel injection valve 40.

Subsequently, at the time point t1 in FIG. 3, the operation temperature of the internal combustion engine 1, which is detected based on the output signal from the temperature sensor 6, becomes less than predetermined temperature Ts (temperature threshold), and the operation state of the internal combustion engine 1, which is detected based on the output signal of the rotation speed sensor 8, increases to a predetermined rotation speed Rs. At the time point t1 in FIG. 3, the control circuit 80 sets the control mode at a low-temperature starting mode. The predetermined temperature Ts is set at 15° C., for example. The predetermined temperature Ts is determined at a lower limit of operation temperature at which the internal combustion engine 1 can be steadily started when using low-volatility main-fuel, which is high in alcohol concentration. The predetermined rotation speed Rs is set at 400 rpm, for example. The predetermined rotation speed Rs is determined at clanking rotation speed at which the internal combustion engine 1 completes starting subsequent to completion of combustion.

At the low-temperature starting mode, the control circuit 80 controls the common selector valve 70 to maintain supplying of sub-fuel to each first fuel injection valve 40. In the present operation, at the low-temperature starting mode, each second fuel injection valve 50 and each first fuel injection valve 40 inject high-volatility sub-fuel, which is low in alcohol concentration, into each cylinder 2. In the present condition, sub-fuel injected from each second fuel injection valve 50 and each first fuel injection valve 40 is preferably sprayed. Thereby, the internal combustion engine 1 can be steadily started even at low temperature equal to or less than the predetermined temperature Ts.

Figure 3:
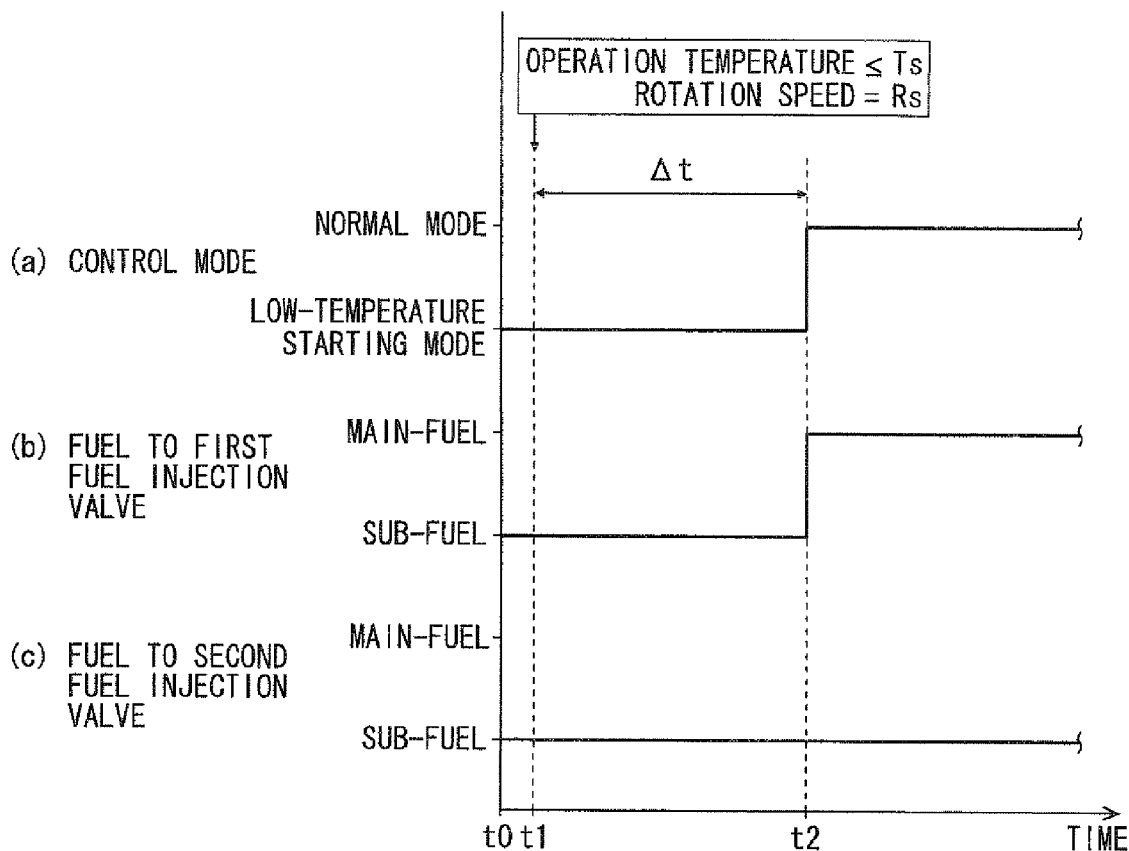
FIG. 3 is a time chart showing a selector control operation of the fuel supply system according to the first embodiment.

The low-temperature starting mode is continued for a predetermined time period Δt since the start time point t1 in FIG. 3. The time period Δt is determined to be longer than a time period between starting of the low-temperature starting mode and completion of combustion of the internal combustion engine 1. At the time point t2 in FIG. 3, the starting operation of the internal combustion engine 1 is completed, and thereby the low-temperature starting mode is also terminated. Thus, the control circuit 80 sets the control mode at a normal mode. In the present embodiment, the control mode is set at the normal mode after starting the selector control operation even before completion of the starting operation of the internal combustion engine 1 in the case where: the rotation speed of the internal combustion engine 1 increases to the predetermined rotation speed Rs; and the operation temperature of the internal combustion engine 1 is greater than the predetermined temperature Ts.

At the normal mode, the control circuit 80 controls the common selector valve 70 to supply main-fuel to each first fuel injection valve 40. In the present operation, at the normal mode, each second fuel injection valve 50 injects sub-fuel into each cylinder 2, and each first fuel injection valve 40 injects main-fuel, which is high in alcohol concentration, into each cylinder 2. Thereby, emission of carbon dioxide caused by combustion of fuel can be reduced, and environmental pollution can be steadily reduced.

Figure 4:
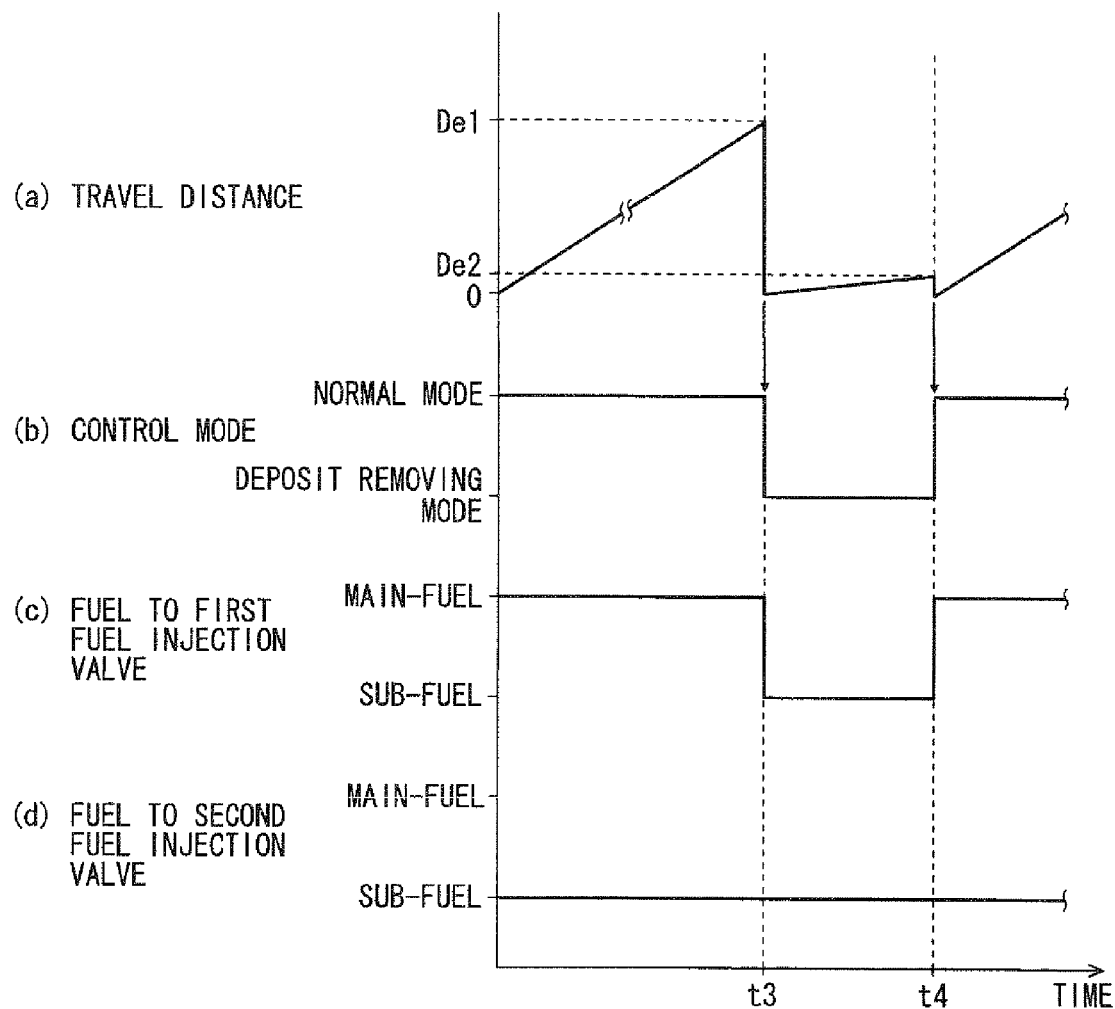
FIG. 4 is a time chart showing a selector control operation of the fuel supply system according to the first embodiment.

At the normal mode, when the travel distance of the vehicle, which is monitored based on the output signal from the velocity sensor 7, increases to a distance (distance threshold) De1 at the time point t3 in FIG. 4, the first fuel injection valve 40 may cause deposit at the tip end. In the present condition, quantity of fuel injected from the first fuel injection valve 40 may decrease due to deposition. In this case, the control circuit 80 sets the control mode at a deposit removing mode. The distance De1, which is used for determining necessity of the deposit removing mode, is set at 500 km, for example. The distance De1 corresponds to a cumulative travel distance at the normal mode after completion of the previous deposit removing mode. The distance De1 is determined in consideration of an amount of deposit, which is produced by deterioration of repeatedly injected main-fuel throughout the cumulative travel distance to cause decrease in quantity of fuel injection.

At the deposit removing mode, the control circuit 80 controls the common selector valve 70 to supply sub-fuel to each first fuel injection valve 40. In the present operation, at the deposit removing mode, each second fuel injection valve 50 and each first fuel injection valve 40 inject high-volatility sub-fuel, which is low in alcohol concentration, into each cylinder 2, similarly to the low-temperature starting mode. In the present injection of sub-fuel, deposit produced on each first fuel injection valve 40 is applied with injection pressure, for example, and thereby the deposit can be removed. Thus, durability of the first fuel injection valve 40 can be steadily enhanced.

The deposit removing mode is continued from the start time point t3 in FIG. 4 to a time point at which the travel distance of the vehicle, which is monitored based on the output signal from the velocity sensor 7, increases to a distance De2, at which deposit produced on the first fuel injection valve 40 is predicted to be removed. The distance De2 is set at 20 km, for example. The distance De2 is determined such that deposit can be removed by injection of sub-fuel, which is repeated from the start time point t3 of the deposit removing mode. At the time point t4 in FIG. 4, deposit is removed from the first fuel injection valve 40. Thus, the control circuit 80 returns the control mode from the deposit removing mode to the normal mode at which environmental pollution can be effectively reduced.

According to the present first embodiment, the common selector valve 70 arbitrary selects one of main-fuel and sub-fuel, which is in appropriate alcohol concentration and supplied to each first fuel injection valve 40, in accordance with the operation of the internal combustion engine 1. Therefore, the internal combustion engine 1 can be steadily started, and environmental pollution can be also steadily reduced, with a simple structure of the fuel supply system 10.

In the present first embodiment, the common selector valve 70 and the control circuit 80 are equivalent to selector control means, the multiple first fuel injection valves 40 are equivalent to a controlled valve, the temperature sensor 6 is equivalent to temperature detecting means, and the velocity sensor 7 and the control circuit 80 are equivalent to history monitoring means.

Second Embodiment

Figure 5:
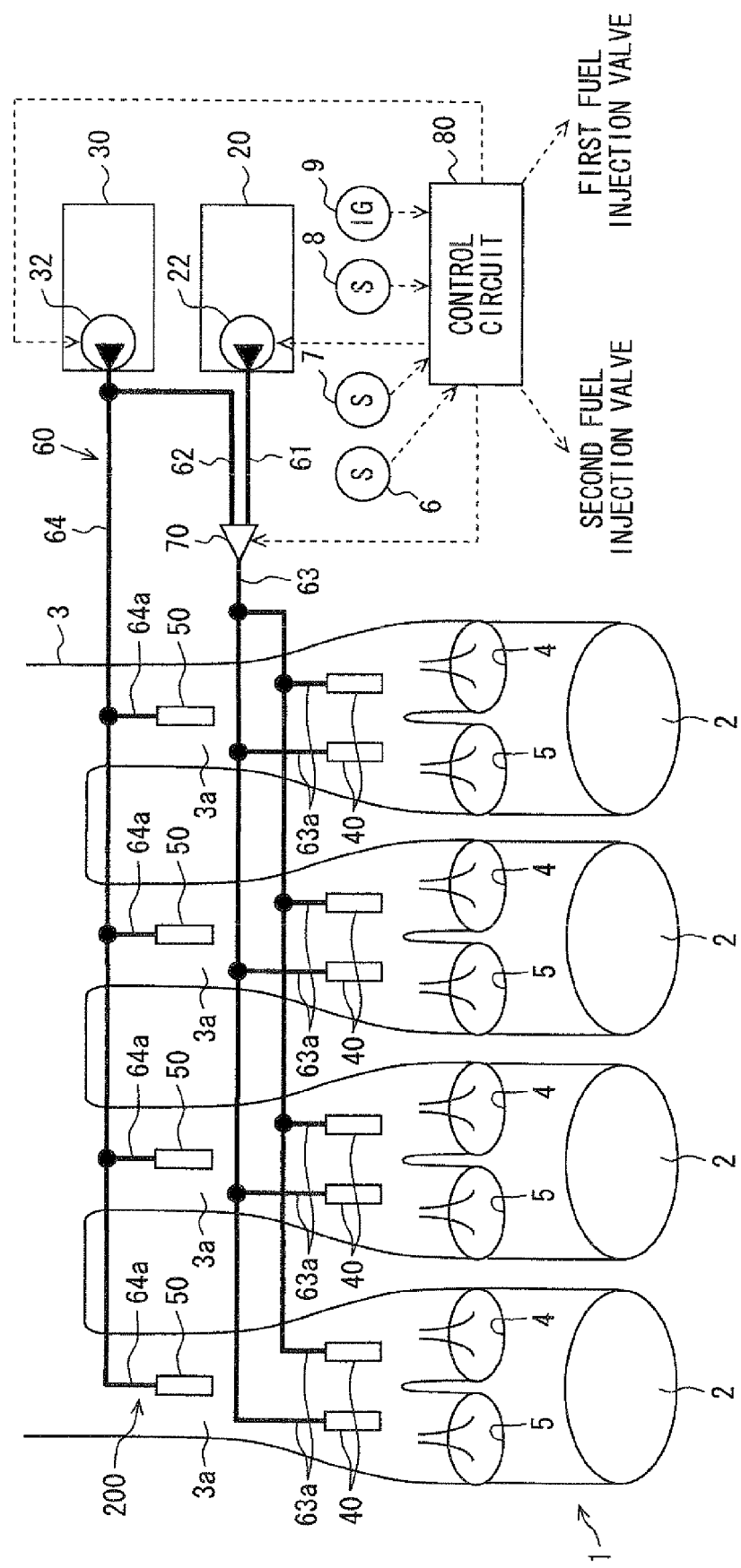
FIG. 5 is a schematic view showing a fuel supply system and an internal combustion engine applied with the fuel supply system according to a second embodiment.

As shown in FIG. 5, the second embodiment is a modification of the first embodiment. In a fuel supply system 200 of the second embodiment, a pair of the first fuel injection valves 40 is provided to each cylinder 2 of the internal combustion engine 1. In each cylinder 2, one of the pair of first fuel injection valves 40 injects fuel through one intake port 4, and the other of the pair of first fuel injection valves 40 injects fuel through another intake port 5. In the present embodiment, the second fuel injection valve 50 is provided to each cylinder 2 to inject fuel through both the intake ports 4, 5 of the cylinder 2.

According to the present second embodiment, the pair of first fuel injection valves 40 is capable of injecting a large amount of main-fuel or sub-fuel, which is in appropriate alcohol concentration, into each cylinder 2, in accordance with the operation of the internal combustion engine 1. Therefore, reduction in environmental pollution caused by injection of main-fuel and enhancement in durability caused by injection of sub-fuel can be further achieved.

In the present second embodiment, the pair of first fuel injection valves 40 provided to each cylinder 2 is equivalent to the controlled valve.

Third Embodiment

Figure 6:
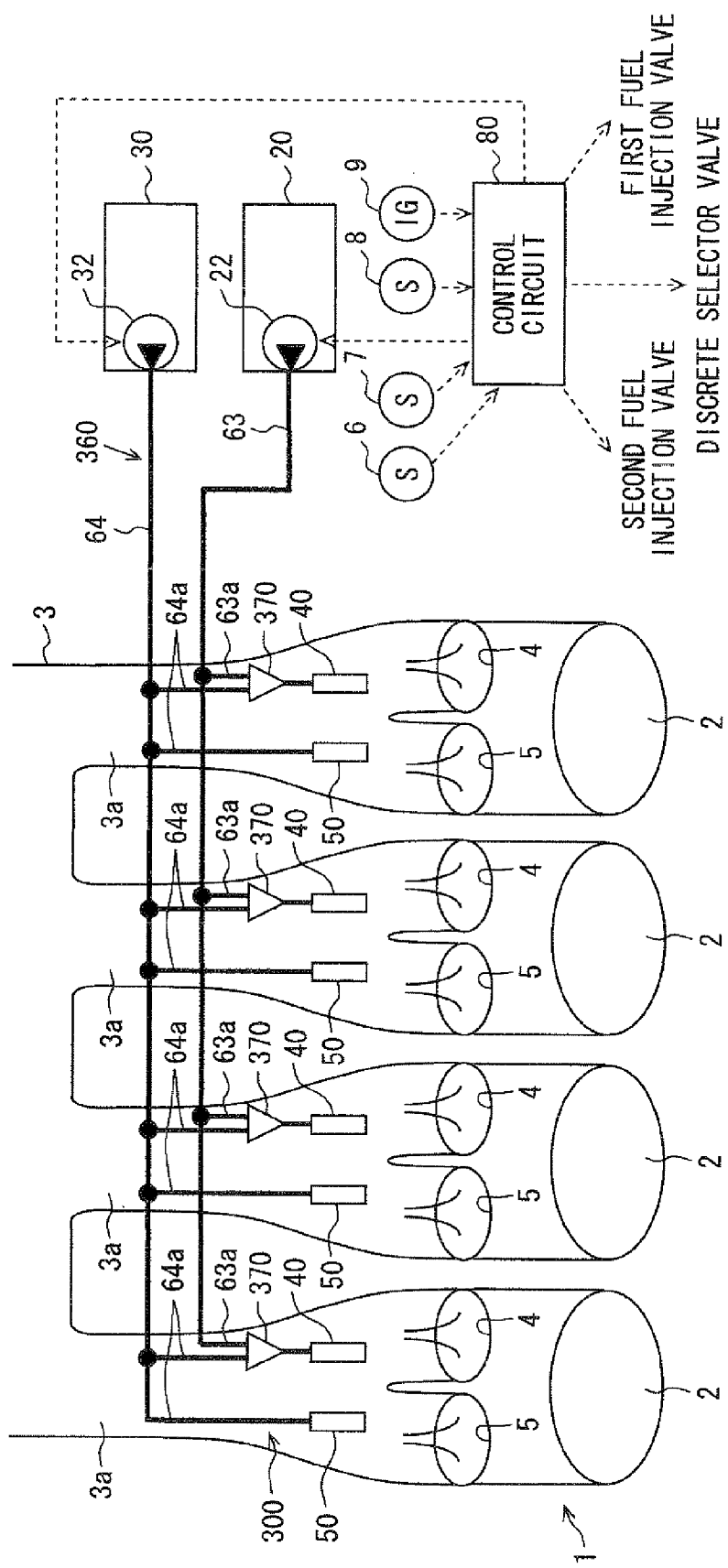
FIG. 6 is a schematic view showing a fuel supply system and an internal combustion engine applied with the fuel supply system according to a third embodiment.

As shown in FIG. 6, the third embodiment is a modification of the first embodiment. In the present third embodiment, a fuel inlet portion 360 of a fuel supply system 300 is not provided with the fuel rails 61, 62, and the first fuel rail 63 is connected with the main-fuel pump 22 in the main-fuel tank 20 to supply main-fuel. The fuel inlet portion 360 is not provided with the common selector valve 70, and each of the branching rails 63a, 64a of the first fuel rail 63 and the second fuel rail 64 and each first fuel injection valve 40 are correspondingly connected with each discrete selector valve 370. Each discrete selector valve 370 is a three-way solenoid valve electrically connected with the control circuit 80. The discrete selector valve 370 is configured to select one of the first fuel rail 63 and the second fuel rail 64 to be connected with the first fuel injection valve 40 in response to electricity supply. When the discrete selector valve 370 communicates the first fuel rail 63 with the first fuel injection valve 40, main-fuel flows from the first fuel rail 63 through the first branching rail 63a to the first fuel injection valve 40. Alternatively, when the discrete selector valve 370 communicates the second fuel rail 64 with the first fuel injection valve 40, sub-fuel flows from the second fuel rail 64 through the second branching rail 64a to the first fuel injection valve 40. In the present structure, each discrete selector valve 370 is provided to each first fuel injection valve 40 so as to select one of main-fuel and sub-fuel to be supplied to the first fuel injection valve 40.

Figure 7:
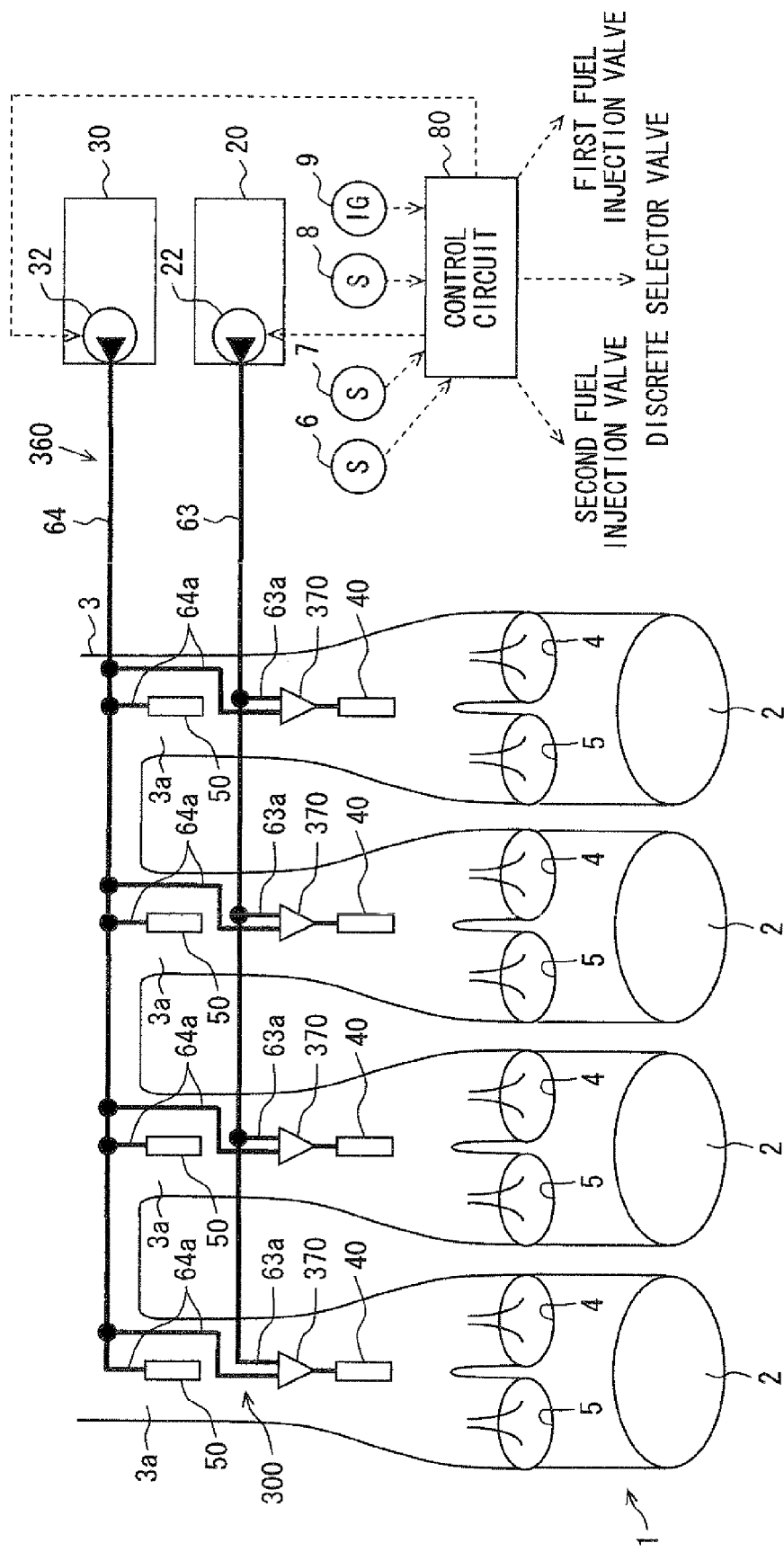
FIG. 7 is one schematic view showing a modification of the fuel supply system shown in FIG. 6.
Figure 8:
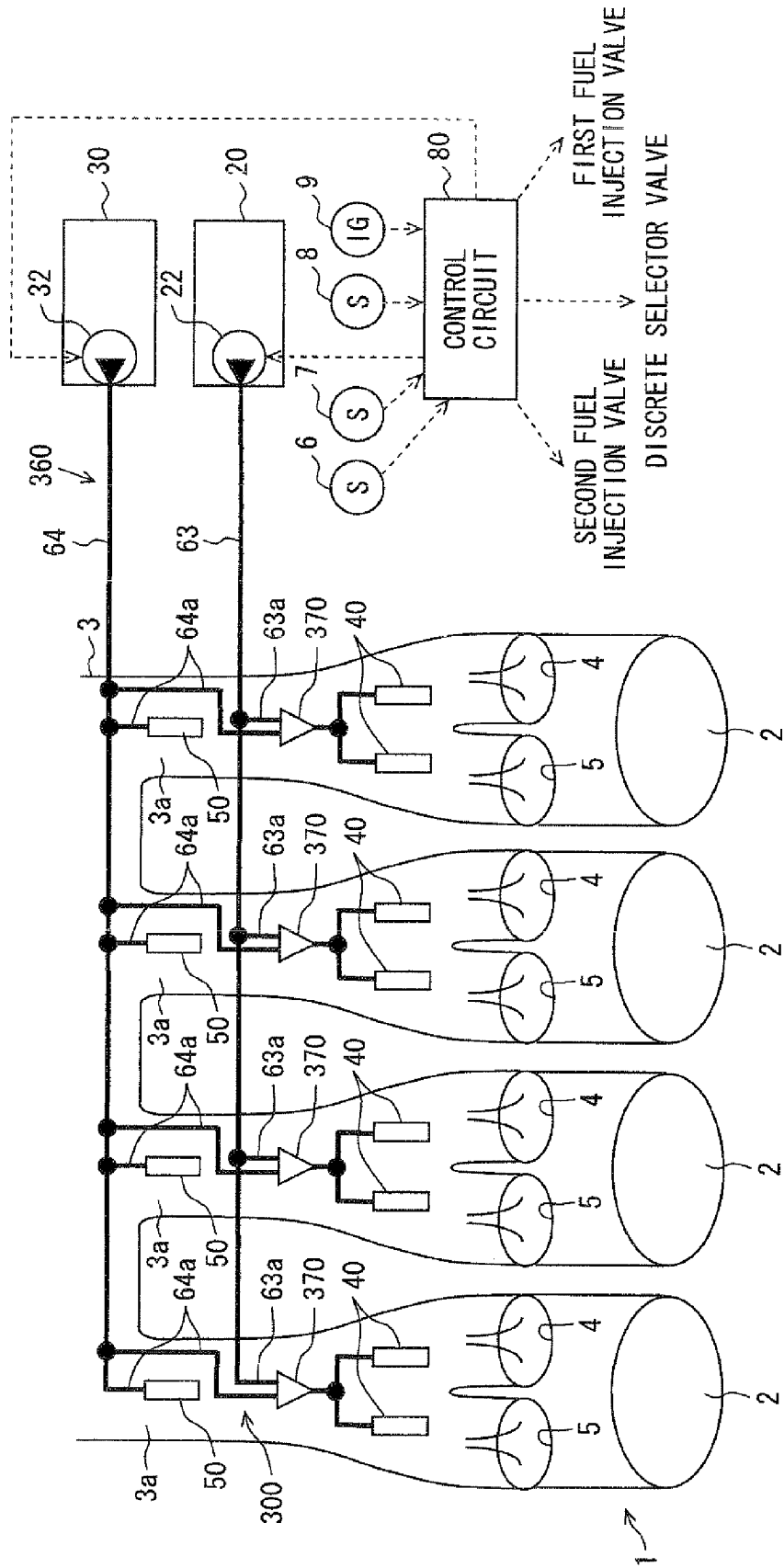
FIG. 8 is a schematic view showing another modification of the fuel supply system shown in FIG. 6.

The locations of the fuel injection valves 40, 50 are not limited to those shown in FIG. 6. For example, the fuel injection valves 40, 50 may be provided in the form of FIG. 7, similarly to the first embodiment. Alternatively, the pair of first fuel injection valves 40 may be provided to each cylinder 2 in the form of FIG. 8, similarly to the second embodiment.

In the selector control operation according to the present third embodiment, at the start time point of the selector control operation and at the low-temperature starting mode, the control circuit 80 controls each discrete selector valve 370 to supply sub-fuel to each first fuel injection valve 40. At the normal mode, the control circuit 80 controls each discrete selector valve 370 to supply main-fuel to each first fuel injection valve 40. At the deposit removing mode, the control circuit 80 controls each discrete selector valve 370 to supply sub-fuel to each first fuel injection valve 40.

According to the present third embodiment, the discrete selector valve 370 arbitrary selects fuel supplied to each first fuel injection valve 40. In particular, in the present structure, each discrete selector valve 370 is individually provided to each first fuel injection valve 40 for selecting fuel supplied to the fuel injection valves 40, and thereby the distance between each discrete selector valve 370 and each first fuel injection valve 40 can be possibly reduced. Therefore, in the present structure, selected one of main-fuel and sub-fuel can be supplied to each first fuel injection valve 40 immediately after the selecting operation of the discrete selector valve 370. Thereby, the internal combustion engine 1 can be steadily started, and environmental pollution can be also steadily reduced.

In the present third embodiment, the discrete selector valves 370 and the control circuit 80 are equivalent to the selector control means.

Fourth Embodiment

Figure 9:
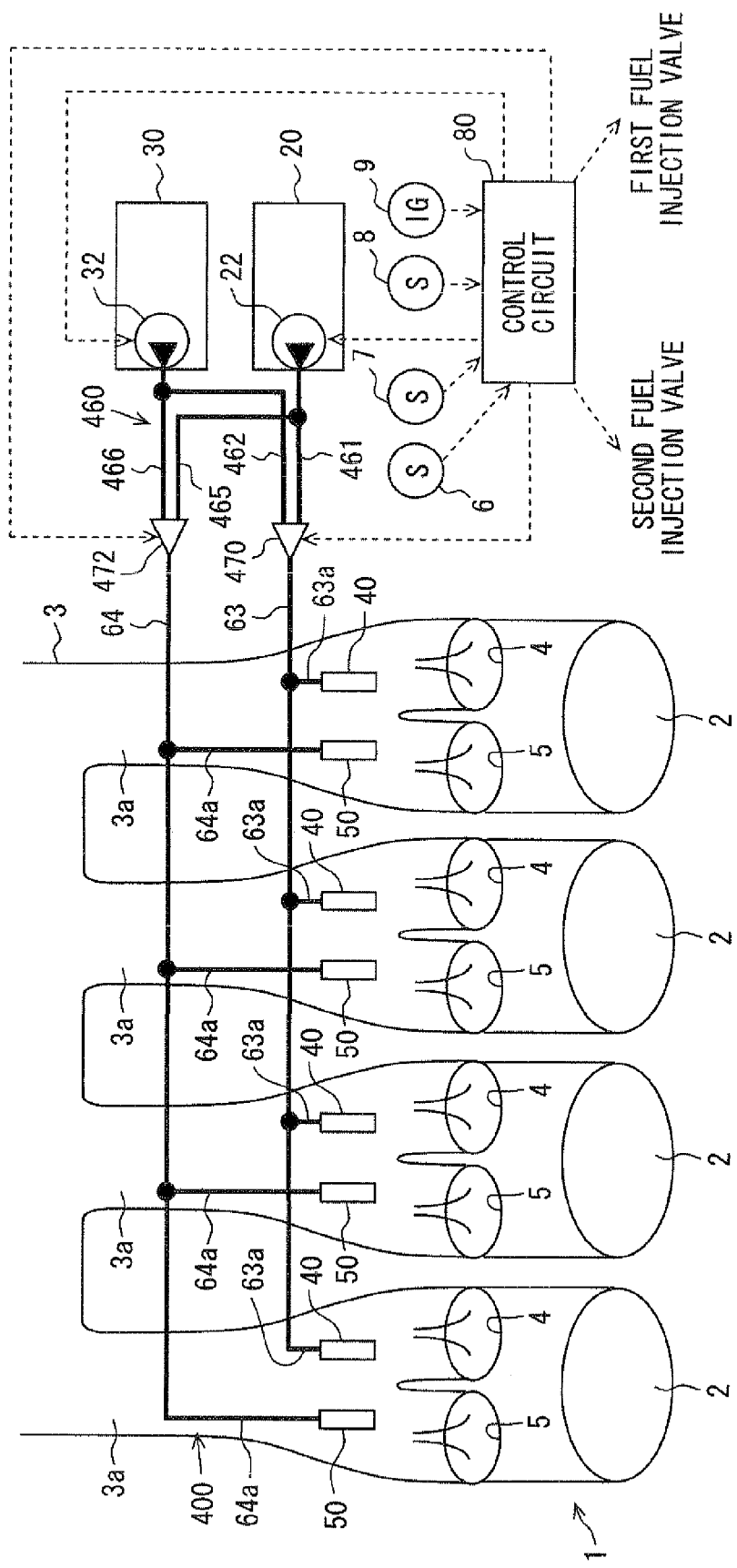
FIG. 9 is a schematic view showing a fuel supply system and an internal combustion engine applied with the fuel supply system according to a fourth embodiment.

As shown in FIG. 9, the fourth embodiment is a modification of the first embodiment. In a fuel supply system 400 according to the present fourth embodiment, a fuel inlet portion 460 includes a first main-fuel rail 461, a first sub-fuel rail 462, a second main-fuel rail 465, and a second sub-fuel rail 466. The first main-fuel rail 461 and the first sub-fuel rail 462 are substantially equivalent to the main-fuel rail 61 and the sub-fuel rail 62. The second main-fuel rail 465 is connected with the main-fuel pump 22 in the main-fuel tank 20 to supply main-fuel. The second sub-fuel rail 466 is connected with the sub-fuel pump 32 in the sub-fuel tank 30 to supply sub-fuel.

The fuel inlet portion 460 according to the fourth embodiment is provided with a first common selector valve 470, which is substantially equivalent to the common selector valve 70. The fuel inlet portion 460 is further provided with a second common selector valve 472. Instead of the sub-fuel pump 32, the second common selector valve 472 is connected with the second fuel rail 64. The second common selector valve 472 is a three-way solenoid valve electrically connected with the control circuit 80. The second common selector valve 472 is connected with the second main-fuel rail 465 and the second sub-fuel rail 466 and configured to perform the selecting operation in response to electricity supply. In the present structure, the second common selector valve 472 is configured to select one of the second main-fuel rail 465 and the second sub-fuel rail 466 to be communicated with the second fuel rail 64. When the second common selector valve 472 communicates the second main-fuel rail 465 with the second fuel rail 64, main-fuel flows from the second main-fuel rail 465 through the second fuel rail 64 to each second fuel injection valve 50. Alternatively, when the second common selector valve 472 communicates the second sub-fuel rail 466 with the second fuel rail 64, sub-fuel flows from the second sub-fuel rail 466 through the second fuel rail 64 to each second fuel injection valve 50. In the present structure, the second common selector valve 472 is provided commonly to the second fuel injection valves 50 so as to select one of main-fuel and sub-fuel to be supplied to the second fuel injection valves 50.

The locations of the fuel injection valves 40, 50 are not limited to those shown in FIG. 9. For example, the fuel injection valves 40, 50 may be provided in the form of FIG. 2, similarly to the first embodiment. Alternatively, the pair of first fuel injection valves 40 may be provided to each cylinder 2, similarly to the second embodiment.

Figure 10:
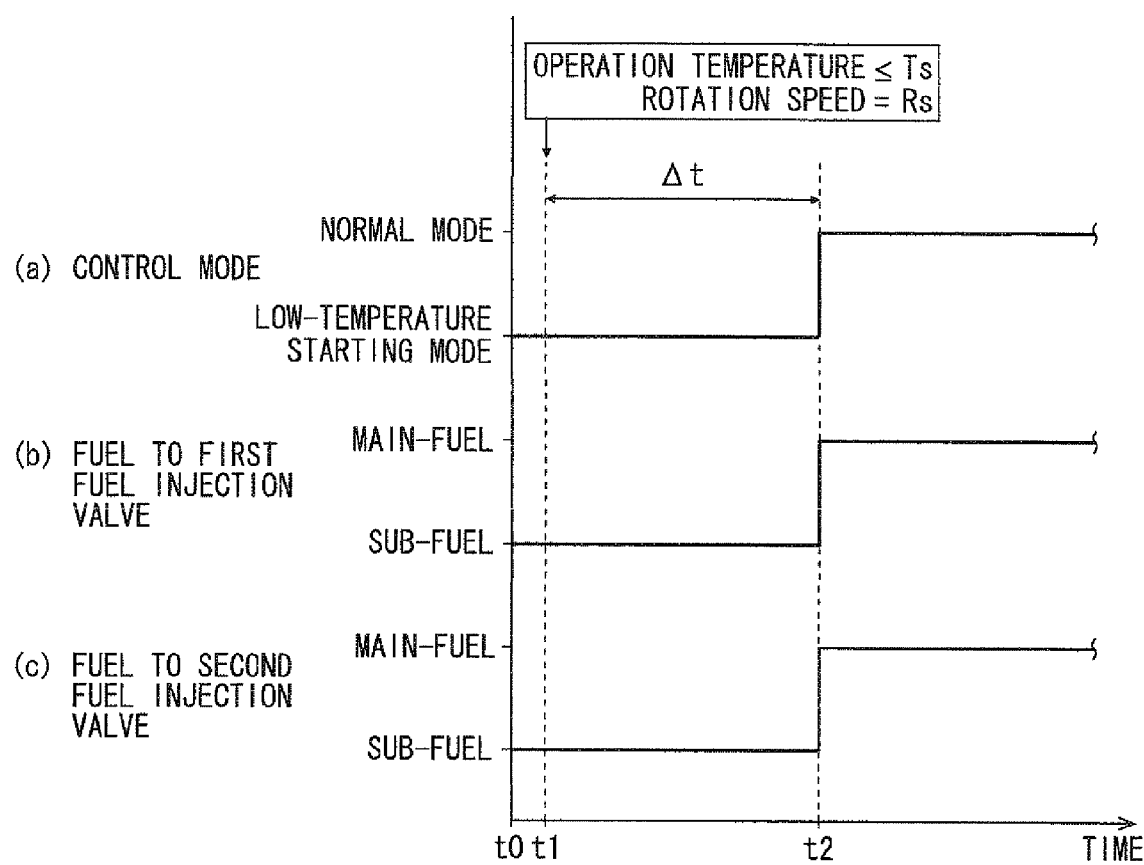
FIG. 10 is a time chart showing a selector control operation of the fuel supply system according to the fourth embodiment.
Figure 11:
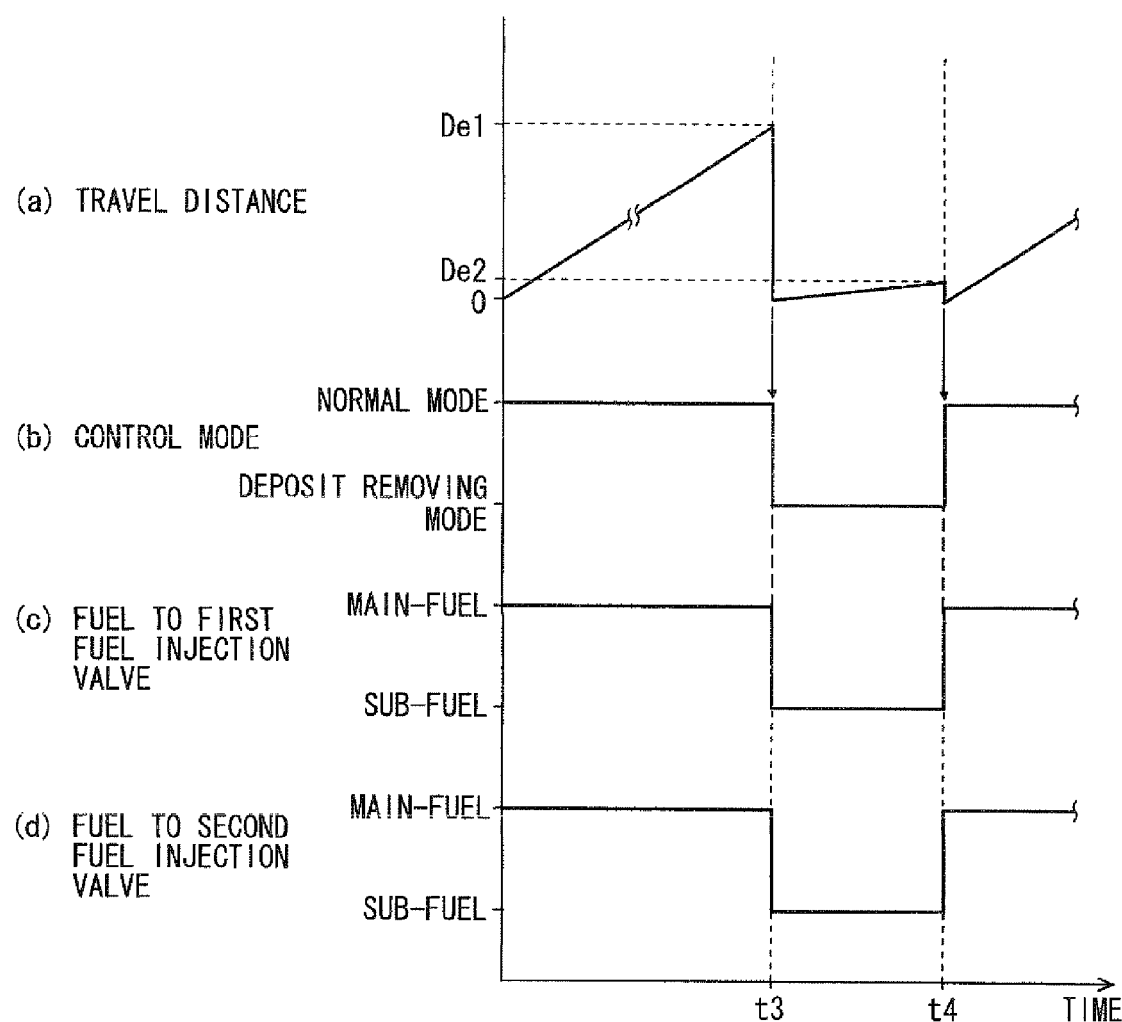
FIG. 11 is a time chart showing a selector control operation of the fuel supply system according to the fourth embodiment.

As shown in FIG. 10, in the selector control operation according to the present fourth embodiment, at the start time point of the selector control operation and at the low-temperature starting mode, the control circuit 80 controls the first common selector valve 470 and the second common selector valve 472 to supply sub-fuel to each first fuel injection valve 40 and each second fuel injection valve 50. As shown in FIGS. 10, 11, at the normal mode, the control circuit 80 controls the first common selector valve 470 and the second common selector valve 472 to supply main-fuel to each first fuel injection valve 40 and each second fuel injection valve 50. At the deposit removing mode, the control circuit 80 controls the first common selector valve 470 and the second common selector valve 472 to supply sub-fuel to each first fuel injection valve 40 and each second fuel injection valve 50.

According to the present fourth embodiment, the first common selector valve 470 arbitrary selects one of main-fuel and sub-fuel to be supplied to each first fuel injection valve 40, and the second common selector valve 472 arbitrary selects one of main-fuel and sub-fuel to be supplied to each second fuel injection valve 50. Therefore, the internal combustion engine 1 can be steadily started, and environmental pollution can be also steadily reduced, with a simple structure of the fuel supply system 10. Furthermore, according to the present fourth embodiment, at the normal mode of the selector control operation, each first fuel injection valve 40 and each second fuel injection valve 50 inject main-fuel into each cylinder 2. Therefore, environmental pollution can be further effectively reduced.

In the present fourth embodiment, the multiple second fuel injection valves 50 and the multiple first fuel injection valves 40 are equivalent to the controlled valve, and the first common selector valve 470, the second common selector valve 472, and the control circuit 80 are equivalent to the selector control means.

Fifth Embodiment

Figure 12:
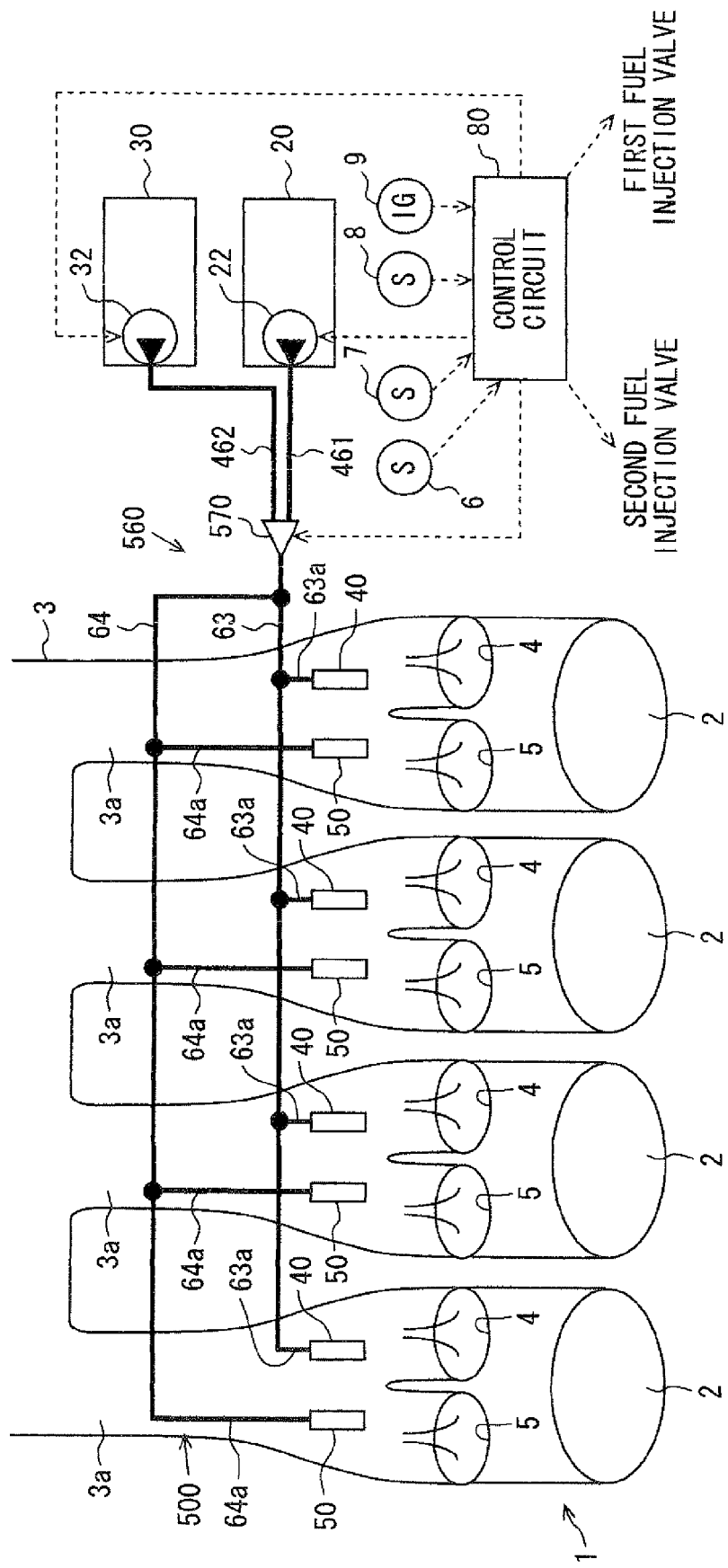
FIG. 12 is a schematic view showing a fuel supply system and an internal combustion engine applied with the fuel supply system according to a fifth embodiment.

As shown in FIG. 12, the fifth embodiment is a modification of the fourth embodiment. In the present fifth embodiment, a fuel inlet portion 560 of a fuel supply system 500 is not provided with the fuel rail 465, 466 and the second common selector valve 472. In the present fifth embodiment, the second fuel rail 64 is connected with a common selector valve 570, which is substantially equivalent to both the first common selector valve 470 in the fourth embodiment and the common selector valve 70 in the first embodiment. In the present structure, the common selector valve 570 also serves as the second common selector valve 472 in the fourth embodiment.

In the selector control operation according to the present fifth embodiment, at the start time point of the selector control operation and at the low-temperature starting mode, the control circuit 80 controls the common selector valve 570 to supply sub-fuel to each first fuel injection valve 40 and each second fuel injection valve 50. At the normal mode, the control circuit 80 controls the common selector valve 570 to supply main-fuel to each first fuel injection valve 40 and each second fuel injection valve 50. At the deposit removing mode, the control circuit 80 controls the common selector valve 570 to supply sub-fuel to each first fuel injection valve 40 and each second fuel injection valve 50.

According to the present fifth embodiment, the single common selector valve 570 arbitrary selects one of main-fuel and sub-fuel to be supplied to each first fuel injection valve 40 and each second fuel injection valve 50. Therefore, the internal combustion engine can be steadily started, and environmental pollution can be also steadily reduced. In addition, the structure of the fuel supply system 10 can be further simplified.

In the present fifth embodiment, the common selector valve 570 and the control circuit 80 are equivalent to the selector control means.

In the present fifth embodiment, the common selector valve 570 serves as the first and second common selector valves 470, 472. That is, the controlled valve includes each of the first and second fuel injection valves 40, 50, and the selector control means includes the common selector valve 570 provided commonly to the first fuel injection valves 40 and the second fuel injection valves 50 for selecting one of main-fuel and sub-fuel supplied to the first fuel injection valves 40 and the second fuel injection valves 50.

Sixth Embodiment

Figure 13:
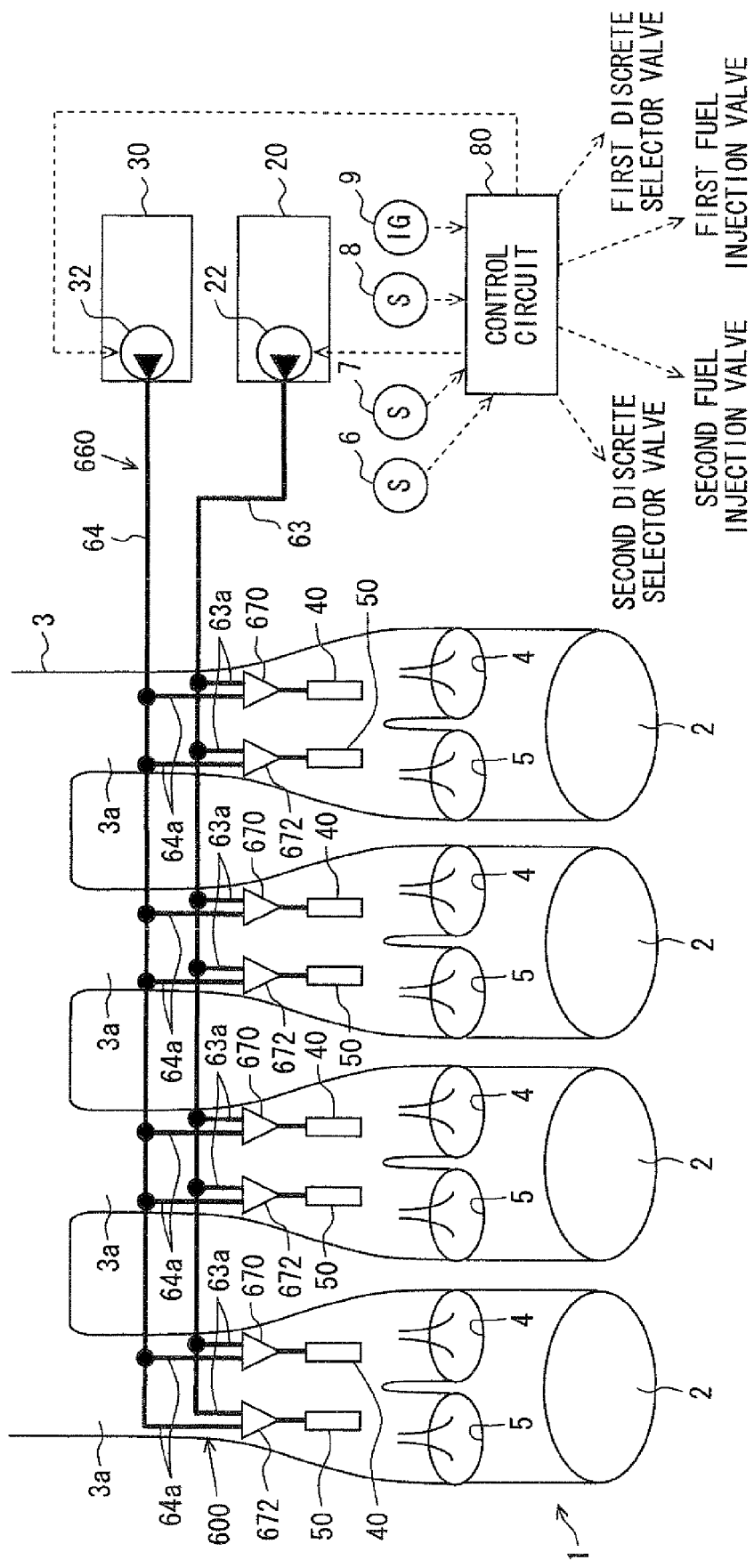
FIG. 13 is a schematic view showing a fuel supply system and an internal combustion engine applied with the fuel supply system according to a sixth embodiment.

As shown in FIG. 13, the sixth embodiment is a modification of the third embodiment. In the present sixth embodiment, a fuel inlet portion 660 of a fuel supply system 600 is provided with multiple discrete selector valves 670, which are substantially equivalent to the multiple discrete selector valves 370. The fuel inlet portion 660 is further provided with multiple second discrete selector valves 672. Each second discrete selector valve 672 is a solenoid three-way valve electrically connected with the control circuit 80. Each of the branching rails 63a, 64a of the first fuel rail 63 and the second fuel rail 64 and each second fuel injection valve 50 are correspondingly connected with each second discrete selector valve 672. In the present structure, the second discrete selector valve 672 is configured to select one of the first branching rail 63a and the second branching rail 64a to be communicated with the second fuel injection valve 50. When the second discrete selector valve 672 communicates the first branching rail 63a with the second fuel injection valve 50, main-fuel flows from the first fuel rail 63 through the first fuel rail 63 to the second fuel injection valve 50. Alternatively, when the second discrete selector valve 672 communicates the second branching rail 64a with the second fuel injection valve 50, sub-fuel flows from the second fuel rail 64 through the second branching rail 64a to the second fuel injection valve 50. In the present structure each second discrete selector valve 672 is provided to each second fuel injection valve 50 so as to select one of main-fuel and sub-fuel to be supplied to the second fuel injection valve 50.

In the selector control operation according to the present sixth embodiment, at the start time point of the selector control operation and at the low-temperature starting mode, the control circuit 80 controls each first discrete selector valve 670 and each second discrete selector valve 672 to supply sub-fuel to each first fuel injection valve 40 and each second fuel injection valve 50, similarly to the fourth embodiment. At the normal mode, the control circuit 80 controls each first discrete selector valve 670 and each second discrete selector valve 672 to supply main-fuel to each first fuel injection valve 40 and each second fuel injection valve 50, similarly to the fourth embodiment. At the deposit removing mode, the control circuit 80 controls each first discrete selector valve 670 and each second discrete selector valve 672 to supply sub-fuel to each first fuel injection valve 40 and each second fuel injection valve 50, similarly to the fourth embodiment.

According to the present sixth embodiment, the first discrete selector valve 670 arbitrary selects one of main-fuel and sub-fuel to be supplied to each first fuel injection valve 40, and the second discrete selector valve 672 arbitrary selects one of main-fuel and sub-fuel to be supplied to each second fuel injection valve 50. In particular, in the present structure, each first discrete selector valve 670 is individually provided to each first fuel injection valve 40 for selecting fuel supplied to the first fuel injection valves 40, and each second discrete selector valve 672 is individually provided to each second fuel injection valve 50 for selecting fuel supplied to the second fuel injection valve 50. Thereby, the distance between each discrete selector valve 670, 672 and corresponding one of the fuel injection valves 40, 50 can be possibly reduced. Therefore, in the present structure, selected one of main-fuel and sub-fuel can be supplied to each fuel injection valve 40, 50 immediately after the selecting operation of corresponding one of the discrete selector valves 670, 672. Thereby, the internal combustion engine can be steadily started, and environmental pollution can be also steadily reduced. Furthermore, according to the present sixth embodiment, at the normal mode of the selector control operation, each first fuel injection valve 40 and each second fuel injection valve 50 inject main-fuel into each cylinder 2. Therefore, environmental pollution can be further effectively reduced.

In the present sixth embodiment, the multiple second fuel injection valves 50 and the multiple first fuel injection valves 40 are equivalent to the controlled valve, and the multiple first discrete selector valves 670, the multiple second discrete selector valves 672, and the control circuit 80 are equivalent to the selector control means.

Seventh Embodiment

Figure 14:
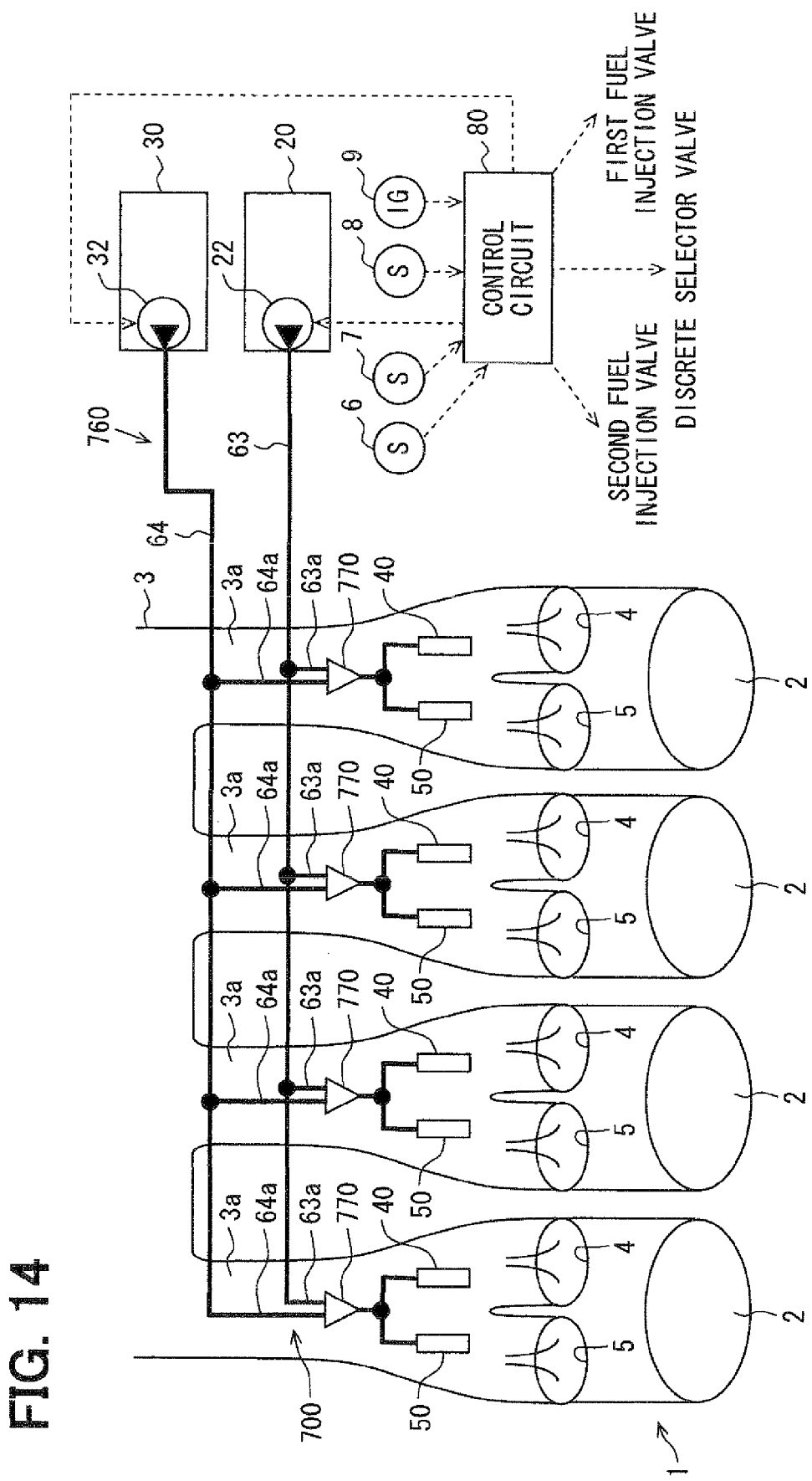
FIG. 14 is a schematic view showing a fuel supply system and an internal combustion engine applied with the fuel supply system according to a seventh embodiment.

As shown in FIG. 14, the seventh embodiment is a modification of the sixth embodiment. In the present seventh embodiment, a fuel inlet portion 760 of a fuel supply system 700 is not provided with the multiple second discrete selector valves 672. In the present seventh embodiment, each second fuel injection valve 50 is connected with each discrete selector valve 770, which is substantially equivalent to both the first discrete selector valve 670 in the sixth embodiment and the discrete selector valve 370 in the third embodiment. In the present structure, each discrete selector valve 770 also serves as the second discrete selector valve 672 in the sixth embodiment.

In the selector control operation according to the present sixth embodiment, at the start time point of the selector control operation and at the low-temperature starting mode, the control circuit 80 controls each discrete selector valve 770 to supply sub-fuel to each first fuel injection valve 40 and each second fuel injection valve 50. At the normal mode, the control circuit 80 controls each discrete selector valve 770 to supply main-fuel to each first fuel injection valve 40 and each second fuel injection valve 50. At the deposit removing mode, the control circuit 80 controls each discrete selector valve 770 to supply sub-fuel to each first fuel injection valve 40 and each second fuel injection valve 50.

According to the present seventh embodiment, each discrete selector valve 770 selects one of the main-fuel and sub-fuel to be supplied to the first fuel injection valve 40 and the second fuel injection valve 50 of the same cylinder 2. Therefore, the internal combustion engine can be steadily started, and environmental pollution can be also steadily reduced. In addition, the structure of the fuel supply system 10 can be simplified.

In the present seventh embodiment, the discrete selector valves 770 and the control circuit 80 are equivalent to the selector control means.

In the present seventh embodiment, each of the discrete selector valves 770 serves as each of the first and second discrete selector valves 670-672. That is, the controlled valve includes each of the first and second fuel injection valves 407 50, and the selector control means includes the discrete selector valves 770 each correspondingly provided to each of the cylinders for selecting one of main-fuel and sub-fuel supplied to each of the first fuel injection valves 40 and the second fuel injection valves 50.

Eighth Embodiment

Figure 15:
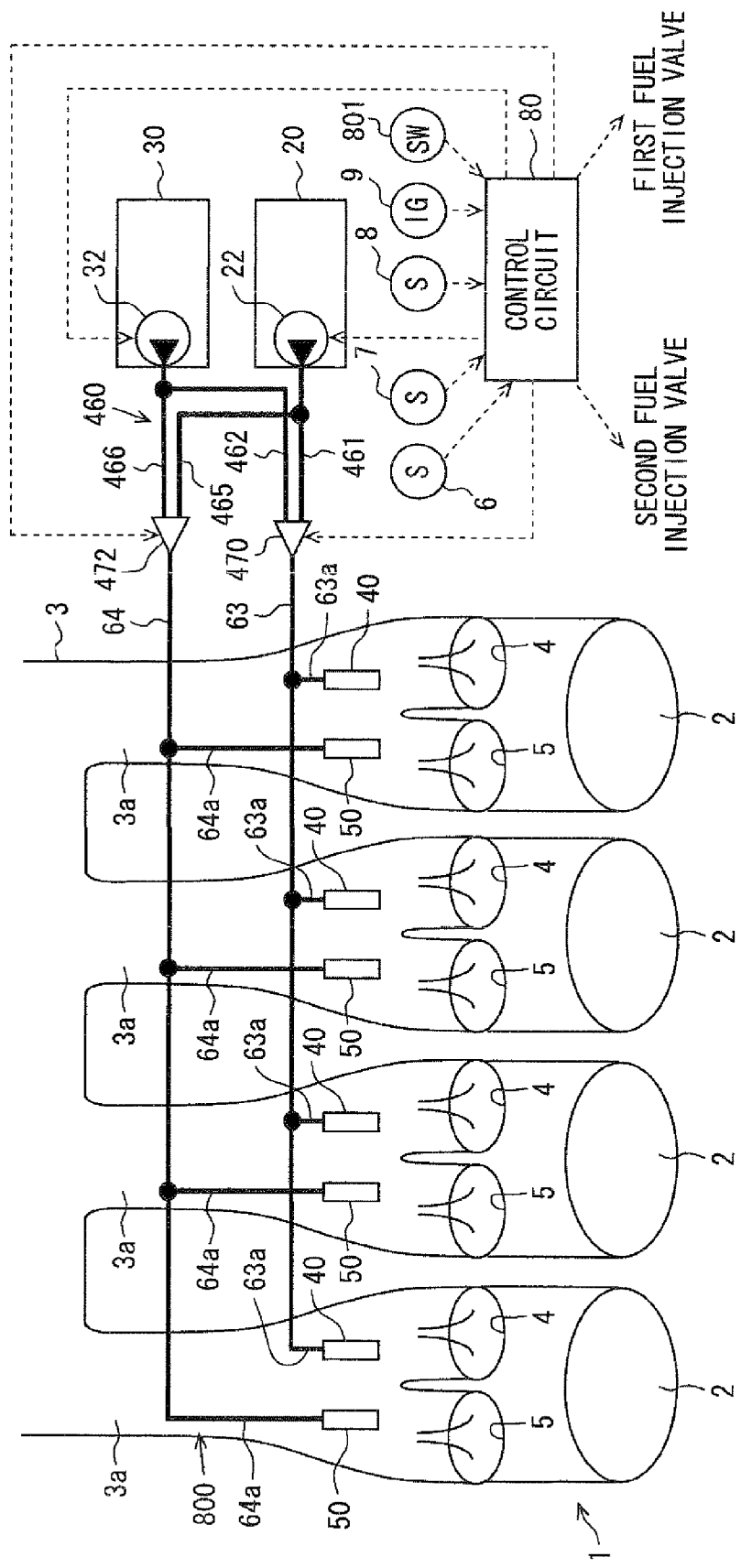
FIG. 15 is a schematic view showing a fuel supply system and an internal combustion engine applied with the fuel supply system according to an eighth embodiment.

As shown in FIG. 15, the eighth embodiment is a modification of the fourth embodiment. In the present eighth embodiment, a fuel supply system 800 is additionally provided with a selector switch 801. The selector switch 801 is operated by an occupant of the vehicle in order to input a selecting instruction for selecting one of main-fuel and sub-fuel to be supplied to each first fuel injection valve 40 and each second fuel injection valve 50. The selector switch 801 has one operation position for inputting the selecting instruction corresponding to main-fuel and another operation position for inputting the selecting instruction corresponding to sub-fuel.

The selector switch 801 is electrically connected with the control circuit 80 and configured to output a signal, which indicates the selecting instruction inputted via the selector switch 801, to the control circuit 80. The control circuit 80 performs a selector control operation of the first common selector valve 470 and the second common selector valve 472 based on the output signal. The selector control operation is one feature of the present eighth embodiment. As follows, the selector control operation will be described in detail with reference to FIG. 16.

The control circuit 80 starts the selector control operation in response to detection of the ON instruction of the internal combustion engine 1 based on the output signal from the ignition switch 9. At the time point t0 in FIG. 16, the selector control operation is started. At this time, when the output signal of the selector switch 801 indicates the selecting instruction corresponding to sub-fuel, the control circuit 80 sets the control mode at a special mode.

At the special mode, the control circuit 80 controls the first common selector valve 470 and the second common selector valve 472 to supply sub-fuel to each first fuel injection valve 40 and each second fuel injection valve 50. In the present operation, at the special mode immediately after starting the selector control operation, each second fuel injection valve 50 and each first fuel injection valve 40 inject high-volatility sub-fuel, which is low in alcohol concentration, into each cylinder 2. Thereby, the internal combustion engine 1 can be steadily started.

The special mode is continued until the control circuit 80 inputs the selecting instruction corresponding to main-fuel caused by operation of the selector switch 801. At the time point t1 in FIG. 16, the control circuit 80 inputs the selecting instruction corresponding to main-fuel, and a sub-fuel mode is terminated. Thus, the control circuit 80 sets the control mode at the normal mode, which is substantially similar to that in the fourth embodiment. At the time point t0 in FIG. 16, at which the selector control operation is started, when the output signal of the selector switch 801 indicates the selecting instruction corresponding to main-fuel, the control circuit 80 sets the control mode at the normal mode from the starting of the selector control operation. In the normal mode according to the present embodiment, emission of carbon dioxide ($CO_2$) caused by combustion of fuel can be sufficiently reduced, and environmental pollution can be also reduced.

According to the present embodiment, at the normal mode at the time point t2 in FIG. 16, the selecting instruction corresponding to sub-fuel is inputted in response to operation of the selector switch 801. At this time, the control circuit 80 sets the control mode at the special mode. In the present operation, each first fuel injection valve 40 and each second fuel injection valve 50 inject sub-fuel, which is low in alcohol concentration, into each cylinder 2. Thus, deposit accumulated on the fuel injection valves 40, 50 can be removed, and thereby durability of the fuel injection valves 40, 50 can be enhanced. At the special mode at the time point t3 in FIG. 16, when the selecting instruction corresponding to main-fuel is inputted in response to operation of the selector switch 801, the control circuit 80 sets the control mode at the normal mode.

According to the eighth embodiment, one of main-fuel and sub-fuel supplied to each first fuel injection valve 40 and each second fuel injection valve 50 can be selected in accordance with the selecting instruction of the selector switch 801. Therefore, startability of the internal combustion engine and reduction in environmental pollution can be enhanced in accordance with determination of an occupant of the vehicle.

In the present eighth embodiment, the selector switch 801 is equivalent to the input means.

Other Embodiment

As described above, the present invention is not limited to the above embodiment, and is capable of being applied to various embodiments as long as being undeviating from the gist thereof.

For example, in the first to eighth embodiments, each cylinder 2 is not limited to be provided with one first fuel injection valve 40 or the pair of first fuel injection valves 40, and it suffices that each cylinder 2 is provided with at least one first fuel injection valve 40. In addition, in the first to eighth embodiments, each cylinder 2 is not limited to be provided with one second fuel injection valve 50, and it suffices that each cylinder 2 is provided with at least one second fuel injection valve 50.

In the first to seventh embodiments, the selector control operation may be performed without one of the low-temperature starting mode and the deposit removing mode. In the first to seventh embodiments, the control circuit 80 may set the control mode at a starting mode at which sub-fuel is supplied to at least one of the controlled valves from the start time point of the selector control operation to the completion of the starting operation regardless of the operation temperature of the internal combustion engine 1. In the first to seventh embodiments, in the selector control operation, the control circuit 80 may determine whether the low-temperature starting mode is to be set by comparing at least two of cooling-water temperature of the internal combustion engine 1, lubricating oil temperature of the internal combustion engine 1, and intake air temperature of the internal combustion engine 1 with corresponding two values of predetermined temperature Ts. In the first to seventh embodiments, the selector control operation according to the eighth embodiment may be performed in addition to or instead of the selector control operation.

The above processings such as calculations and determinations are not limited being executed by the control circuit 80. The control unit may have various structures including the control circuit 80 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit and may be a discrete circuit such as a hardware logic configured with electric or electronic elements or the like. The elements producing the above processings may be discrete elements and may be partially or entirely integrated.

The above embodiments are not limited to an analog circuitry including analog signal handling equipments configured to perform the processings such as comparison and other operations by using analog quantities. For example, at least part of the signals in the circuit structures in the above embodiments may be converted to digital signals, and substantially the same processings may be performed using the converted digital signals by employing a microcomputer, a programmable logic circuit, and the like.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

The above structures of the embodiments can be combined as appropriate. Various modifications and alternations may be diversely made to the above embodiments without departing from the spirit of the present invention.

What is claimed is:

1. A fuel supply system for supplying composite fuel containing alcohol and gasoline to a plurality of cylinders of an internal combustion engine, the composite fuel including main-fuel and sub-fuel, the sub-fuel being lower than main-fuel in concentration of alcohol, the fuel supply system comprising:
    a plurality of first fuel injection valves each provided correspondingly to each of the plurality of cylinders and configured to inject fuel;
    a plurality of second fuel injection valves each provided correspondingly to each of the plurality of cylinders and configured to inject fuel;

a fuel inlet portion configured to supply at least sub-fuel to each of the plurality of first fuel injection valves and each of the plurality of second fuel injection valves; and selector control means for selecting one of main-fuel and sub-fuel supplied through the fuel inlet portion to a controlled valve, wherein the controlled valve includes each of the plurality of first fuel injection valves.

2. The fuel supply system according to claim 1, wherein the controlled valve further includes each of the plurality of second fuel injection valves.

3. The fuel supply system according to claim 1, wherein the selector control means is configured to select the one of main-fuel and sub-fuel in accordance with an operation of the internal combustion engine.

4. The fuel supply system according to claim 3,
wherein the selector control means selects sub-fuel in a starting operation of the internal combustion engine, and
the selector control means selects main-fuel subsequent to the starting operation.

5. The fuel supply system according to claim 4, further comprising:
temperature detecting means for detecting operation temperature of the internal combustion engine,
wherein the selector control means selects sub-fuel in the starting operation in response to detection of the operation temperature to be less than or equal to a temperature threshold.

6. The fuel supply system according to claim 5, wherein the operation temperature is at least one of cooling water temperature of the internal combustion engine, temperature of lubricating oil of the internal combustion engine, and temperature of intake air of the internal combustion engine.

7. The fuel supply system according to claim 3, further comprising:
history monitoring means for monitoring a driving history of the internal combustion engine,
wherein the selector control means selects sub-fuel in response to prediction of accumulation of deposit on the controlled valve in accordance with the driving history, and
the selector control means selects main-fuel in response to prediction of removal of the deposition in accordance with the driving history.

8. The fuel supply system according to claim 7,
wherein the driving history is a travel distance of a vehicle driven by the internal combustion engine, and
the selector control means selects sub-fuel in response to increase in the travel distance to a distance threshold at which the prediction of accumulation of deposition is made.

9. The fuel supply system according to claim 1, further comprising:
input means for inputting a selecting instruction for selecting the one of main-fuel and sub-fuel,
wherein the selector control means is configured to select the one of main-fuel and sub-fuel in accordance with the selecting instruction.

10. The fuel supply system according to claim 1, wherein the selector control means includes a common selector valve provided commonly to the plurality of first fuel injection valves and configured to select one of main-fuel and sub-fuel supplied to the plurality of first fuel injection valves.

11. The fuel supply system according to claim 1, wherein the selector control means includes a plurality of discrete selector valves each correspondingly provided to each of the plurality of first fuel injection valves and configured to select one of main-fuel and sub-fuel supplied to the first fuel injection valve.

12. The fuel supply system according to claim 1,
wherein the controlled valve further includes each of the plurality of second fuel injection valves,
the selector control means includes a first common selector valve provided commonly to the plurality of first fuel injection valves for selecting one of main-fuel and sub-fuel supplied to the plurality of first fuel injection valves, and
the selector control means further includes a second common selector valve provided commonly to the plurality of second fuel injection valves for selecting one of main-fuel and sub-fuel supplied to the plurality of second fuel injection valves.

13. The fuel supply system according to claim 12, wherein the first common selector valve serves as the second common selector valve.

14. The fuel supply system according to claim 1,
wherein the controlled valve further includes each of the plurality of second fuel injection valves,
the selector control means includes a plurality of first discrete selector valves each correspondingly provided to each of the plurality of first fuel injection valves for selecting one of main-fuel and sub-fuel supplied to each of the plurality of first fuel injection valves, and
the selector control means further includes a plurality of second discrete selector valves each correspondingly provided to each of the plurality of second fuel injection valves for selecting one of main-fuel and sub-fuel supplied to each of the plurality of second fuel injection valves.

15. The fuel supply system according to claim 14, wherein each of the plurality of first discrete selector valves serves as each of the plurality of second discrete selector valves.

16. A method for supplying composite fuel containing alcohol and gasoline to a plurality of cylinders of an internal combustion engine, the composite fuel including main-fuel and sub-fuel, the sub-fuel being lower than main-fuel in concentration of alcohol, the method comprising:
selecting one of main-fuel and sub-fuel; and
supplying the one of main-fuel and sub-fuel to a plurality of first fuel injection valves each provided correspondingly to each of the plurality of cylinders.

17. The method according to claim 16,
wherein the supplying includes:
supplying at least sub-fuel to a plurality of second fuel injection valves each provided correspondingly to each of the plurality of cylinders.

18. The method according to claim 16, further comprising:
detecting operation temperature of the internal combustion engine,
wherein the selecting further includes:
selecting sub-fuel in a starting operation of the internal combustion engine in response to detection of the operation temperature to be less than or equal to a temperature threshold; and
selecting main-fuel subsequent to the starting operation.

19. The method according to claim 16, further comprising:
monitoring a driving history,
the selecting further includes:
selecting sub-fuel in response to prediction of accumulation of deposit on the controlled valve in accordance with the driving history; and
selecting main-fuel in response to prediction of removal of the deposition in accordance with the driving history.

20. The method according to claim 16, further comprising:
inputting a selecting instruction,
the selecting further includes:
selecting an other of main-fuel and sub-fuel in accordance with the selecting instruction.

* * * * *